United States Patent Office 2,723,971
Patented Nov. 15, 1955

2,723,971

POLYMERIC PHOSPHATES OF COPOLYMERS OF ACYCLIC ETHYLENICALLY UNSATURATED EPOXY-FREE MONOMERS AND ETHYLENICALLY UNSATURATED EPOXY MONOMERS

Martin E. Cupery, Wilmington, Del., assignor to E. I. du Pont de Nemours and Company, Wilmington, Del., a corporation of Delaware No Drawing. Application March 27, 1953,
Serial No. 345,233

20 Claims. (Cl. 260—85.7)

This invention relates to a new class of polymeric materials and to their preparation. More particularly, this invention relates to copolymers containing phosphoric acid ester groups, which copolymers are soluble in organic solvents, and to coating compositions comprising these copolymers.

This application is a continuation-in-part of my application, Serial No. 218,885, filed April 2, 1951, and now abandoned.

The starting materials for the polymers of this invention are certain copolymeric epoxides. Polymeric epoxides are those polymers which contain epoxy groups

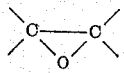

also called oxirane groups. A number of polymers of this type are known in the art, for example, polymers containing glycidyl groups,

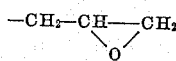

It is an object of this invention to provide novel copolymeric materials and a method for their preparation. A further object is to provide a new class of copolymers containing phosphoric acid ester groups. A still further object is to provide reaction products of epoxide copolymers with phosphoric acid, all of which are soluble in organic solvents, some of which are soluble in aqueous alkaline solutions and others of which are insoluble in such aqueous alkaline solutions. A further object is to provide coating compositions comprising the new polymeric products of this invention as film-forming materials. Other objects will appear hereinafter.

The objects of this invention are accomplished by providing polymeric phosphates which are the reaction products of a polymeric epoxide copolymer and phosphoric acid in amount of at least about one-half mole per oxirane oxygen atom in said copolymer, said polymeric epoxide copolymer having an epoxide oxygen content within the range of 0.3 to 8% by weight and containing within the range of 3 to 60% by weight of a polymerized, ethylenically unsaturated epoxy monomer and within the range of 97 to 40% by weight of a polymerized, ethylenically unsaturated acyclic epoxy-free monomer. These polymeric phosphates are soluble in organic solvents and are useful as the film-forming ingredient in coating compositions.

The novel polymeric phosphoric acid esters of this invention can be obtained by reacting in an inert solvent and at a temperature below 100° C., phosphoric acid with a polymeric epoxide which is a copolymer of a polymerizable ethylenically unsaturated epoxy compound with a polymerizable ethylenically unsaturated acyclic compound free from epoxy groups, said components being present in the copolymer in weight ratio of polymerized epoxy monomer to polymerized epoxy-free monomer within the range of 3:97 to 60:40, the phosphoric acid being used in amount of at least about one-half mole per oxirane oxygen atom in said copolymer. Some of the products of this invention are alkali-soluble, and thus the invention also includes the salts of the aforesaid polymeric phosphates and in particular their water-soluble alkali metal and ammonium salts including substituted ammonium salts.

The structure of the polymeric phosphates of this invention is not known with certainty but it is believed that in all cases these products are linear, or substantially linear, polymers containing as lateral substituents phosphoric acid ester groups,

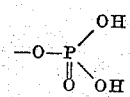

resulting from the opening of the epoxy groups according to the following scheme:

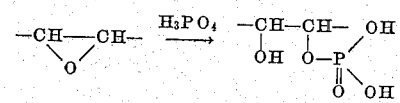

Analysis by electrometric titration with alkali indicates that there are two inflection points in the titration curve, demonstrating the presence of essentially two acidic hydrogens per phosphate group in the polymer. Titrations using thymolphthalein as indicator give acidity values which, based on phosphate content, also indicate the presence of two acidic hydrogen groups per phosphate group in the polymer.

The polymeric phosphates of this invention are conveniently prepared by treating a solution of a polymeric epoxide of the type defined above at about 20% solids in an inert solvent with phosphoric acid at a temperature in the range of 50° to 100° C. for a period of one-half to three hours or at ordinary temperature of 20–25° C. for longer periods of about 15–25 hours. As already stated, there should be used at least about one-half mole of phosphoric acid per oxirane oxygen. Under such conditions, little or no crosslinking takes place between the polymer molecules. Some of the products are soluble in aqueous alkali and in some cases are even soluble in water. Partial or complete neutralization of this type of polymeric phosphates with alkali hydroxides, ammonia or an amine, e. g., an alkylamine of 1 to 4 carbon atoms, gives the alkali, ammonium or substituted ammonium salts, which are water-soluble. In other cases, the polymeric phosphates are insoluble in dilute aqueous alkali (which, for purposes of accuracy, is here defined as 5% aqueous sodium hydroxide). In all cases, however, the polymeric phosphates of this invention are soluble in organic solvents, e. g. acetone.

The factors responsible for the solubility or insolubility in aqueous alkali of the polymeric phosphates of this invention are of a complex nature. However, the principal factors appear to be the extent of phosphation, i. e., the amount of —H₂PO₄ groups in the polymeric phosphates, and the nature and composition of the starting copolymers.

The alkali-soluble polyphosphates are in general obtained by starting with a copolymer containing above about 3.9% by weight of oxirane oxygen, and by reacting such copolymers with at least one mole of phosphoric acid per oxirane group. This oxirane oxygen content corresponds by calculation to a phosphate content, calculated as —H₂PO₄, of about 19% in the resulting polymeric phosphate.

The alkali-insoluble polyphosphates are in general obtained by reacting the epoxy copolymers with phosphoric acid in amount, based on the oxirane oxygen, below that calculated to give about 19% —H₂PO₄ in the resulting polyphosphate. This can be done by using copolymers containing less than about 3.9% oxirane oxygen and reacting such copolymers with at least about 0.5 mole of phosphoric acid per oxirane oxygen; or it can be done by starting with a copolymer of higher oxirane oxygen content than about 3.9% and by reacting such proportion of the epoxy groups of the copolymer with phosphoric acid that the calculated —H₂PO₄ content of the resulting polyphosphate is less than about 19% by weight.

It will be at once apparent to the skilled chemist that the values for the oxirane oxygen content and the corresponding calculated phosphate content as determining factors in alkali-solubility versus insolubility can vary somewhat from those given above because of the influence of other factors such as the nature of the comonomers and of the copolymers derived therefrom, the molecular weight of the copolymers, and the reaction conditions. For example, with respect to the epoxy comonomer, it has been found that glycidyl ether monomers, such as allyl glycidyl ester, react more readily with phosphoric acid than glycidyl esters, such as glycidyl methacrylate. Variations are also caused by the nature of the epoxy-free monomer.

It has been found that copolymers containing polymerized vinyl carboxylates, such as vinyl acetate, i. e., polymers containing acyloxy groups, form polyphosphates which deviate from the above-described general limitations with respect to the phosphate content required to impart alkali solubility. Such polyphosphates have been found to be soluble in alkali even at calculated phosphate contents well below 19%. This is also the case with polyphosphates of epoxide copolymers in which the epoxy-free component is a polymerized methacrylic acid ester of an alcohol containing a water-solubilizing group such as an ether group, e. g., beta-methoxyethyl methacrylate.

The invention is illustrated in greater detail in the following examples, in which parts are by weight. The examples illustrate also some of the most important among the many uses of these polymers, viz., their uses in coating compositions, as sizes for textile fibers and as agents in the treatment of leather.

Examples I–VI inclusive illustrate the preparation of alkali-soluble polyphosphates from epoxy copolymers in which the polymerized epoxy-free monomer is free from acyloxy groups.

*Example I*

A copolymer of allyl glycidyl ether and butyl methacrylate was prepared by adding at a uniform rate over a period of about 2 hours a solution of 852 parts of butyl methacrylate, 342 parts of allyl glycidyl ether and 36 parts of di-tertiary butyl peroxide to 1149 parts of allyl glycidyl ether heated at 130° C. (±2° C.) under nitrogen atmospheres. After the addition was completed, the polymerization mixture was heated at 130–132° C. for an additional period of one hour. The unchanged monomers were then removed by distillation under a pressure of 0.1–1 mm. of mercury while heating at about 100° C. There remained 1258 parts of a polymer which was soft and viscous at 100° C. This polymer contained about 4% of oxirane oxygen (28% polymerized allyl glycidyl ether), corresponding to an oxirane equivalent weight of about 400, and it had a molecular weight of about 1900.

To a solution of 73 parts of this polymeric epoxide in 200 parts of acetone was added 24 parts of 85% phosphoric acid (about 1.14 moles of phosphoric acid per oxirane oxygen). The temperature increased spontaneously to about 50° C. because of the heat of the exothermic reaction. The reaction was completed by heating the mixture at reflux temperature (58° C.) for about one hour. The polymeric phosphate precipitated from the solution upon addition of water but it dissolved readily in dilute ammonium hydroxide or sodium hydroxide, and could be reprecipitated from its alkaline solutions by acidification. A solution of about 17% of this polymeric phosphate in dilute ammonium hydroxide gave on evaporation clear, transparent, hard, tough films which after curing by heating at 120° C. for about 20 minutes were insoluble in water and unaffected by most organic solvents.

*Example II*

A copolymer of glycidyl methacrylate

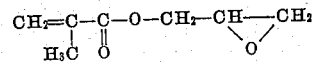

and butyl methacrylate was prepared by heating for 2 hours at 80° C. a solution of 18 parts glycidyl methacrylate, 28.4 parts butyl methacrylate and 0.9 part benzoyl peroxide in 110 parts dioxane. The conversion of monomer to polymer was over 90% of theory. The copolymer contained 4.33% by weight of oxirane oxygen, corresponding to 38.4% polymerized glycidyl methacrylate, and it had a molecular weight of about 4000.

To a solution of 2 parts of 85% phosphoric acid in 8 parts of methyl ethyl ketone was added with stirring 5 parts of a 30% solution of the above copolymer in dioxane (about 4.3 moles phosphoric acid per oxirane oxygen). The solution was heated at 75° C. for one-half hour and then poured into about 100 parts of water to precipitate the polymeric phosphate. After washing the precipitate with water to remove the excess phosphoric acid, the polymer was dissolved, with warming to 50° C., in 15 parts of water containing 1 part of concentrated ammonium hydroxide. Dilute solutions (5% or lower) of this ammonium polyphosphate do not precipitate upon addition of acetic acid to pH 4.5. Upon evaporation of aqueous solutions of the ammonium salt, clear, colorless, hard, tough coatings are obtained. Addition of aqueous solutions of inorganic aluminum and calcium salts to the ammonium polyphosphate solution gives precipitates of aluminum and calcium polyphosphates.

*Example III*

A copolymer of glycidyl methacrylate and methyl methacrylate was prepared by heating 17.5 parts of glycidyl methacrylate, 32.5 parts of methyl methacrylate, 1 part of alpha,alpha'-azodiisobutyronitrile and 120 parts of acetone in a closed vessel for 16 hours at about 75° C. with moderate agitation. Conversion of monomer to polymer was substantially 100%. The copolymer contained 35% of polymerized glycidyl methacrylate, 65% of polymerized methyl methacrylate and 3.94% of oxirane oxygen.

The polymer solution was diluted with acetone to give a solution containing 25 parts of polymer solids and 100 parts of acetone. To this solution were added 21.23 parts of aqueous orthophosphoric acid (85.4% H₂PO₄), corresponding to about 3 moles of phosphoric acid per oxirane oxygen. The resulting mixture was heated in a closed vessel for 1½ hours at about 60° C. with moderate agitation. A clear solution of the phosphate of the epoxide copolymer was thus produced. The polymeric phosphate, containing approximately 19.3% of phosphate calculated as —H₂PO₄, was precipitated by adding the solution to 500 parts of water. The precipitate was separated by filtration and was washed twice with 50 part portions of water. Then the precipitate was redissolved in acetone, reprecipitated with water and filtered. Approximately 1 part of the wet precipitate was added to 100 parts of 5% aqueous sodium hydroxide and, in a separate test, to 100 parts of 5% aqueous ammonium hydroxide. It was soluble in both alkaline solutions. Although the resulting solutions were milky and not completely clear, they contained no filterable solid matter.

*Example IV*

A copolymer of glycidyl methacrylate and butyl methacrylate was prepared by the method described in Example III, using 17.5 parts of glycidyl methacrylate, 32.5 parts of butyl methacrylate, 1 part of alpha,alpha'-azodiisobutyronitrile and 150 parts of acetone. Polymerization was substantially complete, giving a copolymer containing 35% of polymerized glycidyl methacrylate, 65% of polymerized butyl methacrylate and 3.94% of oxirane oxygen. This was treated as in Example III with 14.15 parts of 85.4% phosphoric acid, corresponding to 1 mole of phosphoric acid per oxirane oxygen. The polymeric phosphate, isolated as in Example III, was soluble in both 5% sodium hydroxide and 5% ammonium hydroxide. The solutions were milky but did not contain any filterable solid matter.

Example V

A pressure vessel was charged with 840 parts of allyl glycidyl ether, 360 parts of vinyl chloride and 43 parts of alpha,alpha'-azodiisobutyronitrile. The vessel has heated at 80° C. for 16 hours, then the unreacted vinyl chloride was distilled off and the residual product was stripped of the unchanged allyl glycidyl ether by distillation at 130–170° C. at 0.25 to 0.04 mm. mercury pressure. The polymeric epoxide thus obtained was a soft viscous material containing 6.17% oxirane oxygen, corresponding to 44% polymerized allyl glycidyl ether, and having a molecular weight of about 1600.

To a solution of 40 parts of this polymeric epoxide in 160 parts of dioxane was added 30 parts of 85% phosphoric acid (about 1.7 moles phosphoric acid per oxirane oxygen) and the homogeneous solution was heated at 70–90° C. for about 15 minutes. The resulting polymeric phosphate was water soluble. It was precipitated by addition of 10% aqueous sodium chloride and was washed free of excess phosphoric acid by repeated washings with 5% sodium chloride solution. The final product was water soluble and its aqueous solutions could be treated with basic reagents such as ammonia, amines or alkali metal hydroxides to give weakly acidic, neutral or basic solutions. Coatings obtained from aqueous solutions of this polymeric phosphate were clear, hard, tough and had good adhesion to various substrates such as metal or glass. Films of the ammonium salt of this polymeric phosphate became insoluble in water upon heating at 105–150° C.

Example VI

A solution of 125 parts acrylonitrile, 125 parts allyl glycidyl ether and 15 parts of di-tertiary butyl peroxide was added at a uniform rate over a period of about 2 hours to 250 parts of allyl glycidyl ether held at a temperature of 120 to 145° C. in a closed vessel. When all was added the refluxing was continued at about 138° C. for 1.5 hours. The polymerization mixture was freed of unchanged monomers by heating at 90° C. under less than 1.0 mm. mercury pressure for about 4 hours. There remained 263 parts of a slightly colored, soft, glassy solid which was soluble in acetone, dioxane, chloroform and cyclohexanone but was insoluble in xylene, butyl acetate and water. Based on monomers recovered, the copolymer contained about 54% by weight of allyl glycidyl ether and 46% by weight of acrylonitrile.

To a solution of 3 parts of the above copolymer dissolved in 12 parts of dioxane was added 3 parts of 85% orthophosphoric acid (about 1.84 moles of phosphoric acid per oxirane oxygen). The solution was heated at 75° C. for one hour. The product so obtained was soluble in water but coagulated from the aqueous solution upon the addition of sodium chloride. After washing three times with 5% aqueous sodium chloride the residual polymer was dissolved in water containing a low amount of ammonia. Upon evaporation on glass plates, such aqueous solutions gave films which were clear, hard and tough, and had excellent adhesion.

Examples VII–XII inclusive illustrate the preparation of alkali-insoluble polyphosphates.

Example VII

A copolymer of glycidyl methacrylate and methyl methacrylate was prepared by heating 15.0 parts of glycidyl methacrylate monomer, 35.0 parts of methyl methacrylate monomer and 1 part of alpha,alpha'-azodiisobutyronitrile in 100 parts of acetone in a closed vessel for 16 hours at about 75° C. with moderate agitation. Conversion of monomer to polymer was substantially 100%. The copolymer contained 3.38% by weight of oxirane oxygen, corresponding to 30% polymerized glycidyl methacrylate and 70% polymerized methyl methacrylate.

To 150 parts of the above-prepared solution (containing 50 parts of epoxide copolymer) were added 12.12 parts of aqueous orthophosphoric acid (85.4% $H_3PO_4$). The resulting mixture was heated in a closed vessel for 1½ hours at about 60° C. with moderate agitation. The proportions were equivalent to 1 mol of $H_3PO_4$ for each mol of oxirane oxygen. A clear solution of the phosphate of the epoxide copolymer was thus produced. The polymeric phosphate, containing approximately 17% of phosphate calculated as $—H_2PO_4$, was precipitated by adding the solution to 500 cc. of water. The precipitate was separated by filtration and was washed twice with 50 cc. portions of water. Then the precipitate was redissolved in acetone, reprecipitated with water and filtered. Approximately 1 part of the thus-produced wet precipitate was added to 100 parts of a 5% ammonium hydroxide solution in water. The precipitate did not dissolve even when stirred and heated at 80° C. for 5 minutes. The precipitate was similarly insoluble in 5% sodium hydroxide.

A clear coating composition was prepared in the form of a 30% solution of the copolymeric phosphate of this example in acetone. A thin coating of this solution was poured on a clean steel panel which was then baked for 45 minutes at 280° F. A clear hard film resulted, which protected the metal from rusting.

A pigmented enamel was prepared by grinding in a ball mill until a smooth dispersion was obtained, 125 parts of the copolymeric phosphate, 251 parts of methyl isobutyl ketone, 35 parts of butyl alcohol, 100 parts of ethylene glycol monoethyl ether acetate and 100 parts of titanium dioxide pigment. The resulting enamel was sprayed on a clean metal panel which was baked for 30 minutes at 300° F. There resulted a durable white glossy coating which protected the metal substrate from rusting. An enamel of these properties is useful for finishing electrical appliances, outdoor furniture, and a wide variety of metal and ceramic articles. Although baking or curing at high temperatures imparts the most useful properties to coatings prepared from the products of this invention, baking is not essential. Coatings may be dried in the air and therefore may be used on substrates which will not withstand a large amount of heat such as wood, organic fabrics and leather.

Example VIII

The process of Example VII was repeated in all respects except for the proportions of glycidyl methacrylate monomer and methyl methacrylate monomer, the composition of the resulting copolymer, and the proportion of orthophosphoric acid, which were as follows:

|  | VIII-A | VIII-B | VIII-C |
|---|---|---|---|
| Comonomer charge (parts): |  |  |  |
|   Glycidyl methacrylate | 7.5 | 10 | 12.5 |
|   Methyl methacrylate | 42.5 | 40 | 37.5 |
| Copolymer composition (percent): |  |  |  |
|   Glycidyl methacrylate | 15 | 20 | 25 |
|   Methyl methacrylate | 85 | 80 | 75 |
|   Oxirane oxygen | 1.69 | 2.25 | 2.82 |
| 85.4% $H_3PO_4$ (parts) | 6.06 | 8.09 | 10.11 |
| Mols $H_3PO_4$ per mol of oxirane oxygen | 1 | 1 | 1 |
| Percent phosphate (as $—H_2PO_4$) in polymeric phosphate | 9.2 | 12 | 14.5 |

The polymeric phosphates prepared in VIII-A, VIII-B and VIII-C of this example were insoluble in 5% ammonium hydroxide and 5% sodium hydroxide, as was the product of Example VII.

Example IX

An epoxide copolymer containing 35% of polymerized glycidyl methacrylate, 65% of polymerized methyl methacrylate and 3.94% of oxirane oxygen was prepared as in Example VII from 17.5 parts of glycidyl methacrylate, 32.5 parts of methyl methacrylate, 1 part of alpha,alpha'-azodiisobutyronitrile and 120 parts of acetone.

Treatment of the resulting copolymer solution with 14.15 parts of 85.4% phosphoric acid (1 mole of $H_3PO_4$ per mole of oxirane oxygen) by the method of Example VII produced a gelled system. This result appeared to have been caused by too high a concentration of the copolymer in the solution.

Therefore, a less concentrated solution of the copolymer (25 parts copolymer solids, 225 parts acetone) was treated, by the method of Example VII, with 5.65 parts of 85.4% phosphoric acid. This corresponds to 0.8 mole of phosphoric acid per oxirane oxygen. A clear solution of the polymeric phosphate resulted. The polymeric material was isolated as in Example VII. Approximately 1 part of the thus-produced wet precipitate was insoluble in 100 parts of both 5% aqueous ammonium hydroxide and 5% aqueous sodium hydroxide.

Example X

Phosphates of glycidyl methacrylate/butyl methacrylate copolymers were prepared by the method described in Example VII. The charges and the composition of the resulting products were as follows:

|  | X-A | X-B |
|---|---|---|
| Comonomer charge (parts): |  |  |
| Glycidyl methacrylate | 12.5 | 15.0 |
| Butyl methacrylate | 37.5 | 35.0 |
| Alpha, alpha' azodiisobutyronitrile | 1.0 | 1.0 |
| Acetone | 120 | 120 |
| Copolymer composition (percent): |  |  |
| Glycidyl methacrylate | 25 | 30 |
| Butyl methacrylate | 75 | 70 |
| Oxirane oxygen | 2.82 | 3.38 |
| 85.4% $H_3PO_4$ (parts) | 10.10 | 12.10 |
| Mols $H_3PO_4$ per mol of oxirane oxygen | 1 | 1 |
| Percent phosphate (as —$H_2PO_4$) in polymeric phosphate | 14.5 | 17.0 |

Both of the polymeric phosphate products of X-A and X-B of this example were insoluble in both 5% aqueous ammonium hydroxide and 5% aqueous sodium hydroxide.

Example XI

A copolymer of allyl glycidyl ether and methyl methacrylate was prepared as follows:

Portion A:  Parts
  Allyl glycidyl ether monomer _____ 642
Portion B:
  Allyl glycidyl ether monomer _____ 258
  Methyl methacrylate monomer _____ 600
  Benzoyl peroxide _____ 16

Portion A was placed in a closed reaction vessel equipped with an agitator, reflux condenser and thermometer and was heated to about 130° C. Portion B was then added slowly at a constant rate during the ensuing 3½ hours while the temperature was maintained at about 130° C. After all of Portion B had been added, the batch was held at this temperature for an additional 20 minutes. The unreacted monomers were then removed by distillation.

Approximately 50% of the starting monomers were thus converted to a copolymer containing approximately 20% of polymerized allyl glycidyl ether and 80% of polymerized methyl methacrylate. The oxirane oxygen content of the copolymer was approximately 2.81%. The copolymer was dissolved in 750 parts of methyl ethyl ketone to produce a clear solution having a 50% solids content.

A polyphosphate of the above described copolymer was prepared by reacting 750 parts of the 50% solution with 75.5 parts of aqueous 85.4% $H_3PO_4$ in 500 parts of acetone at 60°–70° C. for 1 hour with moderate agitation. The proportions of copolymer and phosphoric acid were equivalent to one mol of $H_3PO_4$ for each mol of oxirane oxygen. A clear solution resulted in which the polymeric phosphate contained approximately 14.5% of —$H_2PO_4$.

The polymeric material was separated by precipitation, filtration and washing as in Example I. Approximately one part of the wet precipitate was added to 100 parts each of 5% ammonium hydroxide and 5% sodium hydroxide and was found to be insoluble in both media.

Example XII

A copolymer of allyl glycidyl ether and vinyl chloride was prepared by reacting 630 parts of allyl glycidyl ether monomer, 1470 parts of vinyl chloride monomer and 21 parts of alpha, alpha'-azodiisobutyronitrile in 922 parts of benzene in an agitated autoclave at about 60° C. for 18 hours under an autogenous pressure of 60–70 pounds per square inch gauge.

Approximately 30% of the starting monomers were thus converted to a copolymer containing approximately 21% of polymerized allyl glycidyl ether and approximately 79% of polymerized vinyl chloride. The oxirane content of the copolymer was approximately 2.95%.

The polymeric material was separated by adding approximately 3 volumes of methyl alcohol for each volume of copolymer solution and filtering. The precipitate was dissolved in acetone, reprecipitated in methyl alcohol, filtered and dried.

A polyphosphate of the above described copolymer was prepared by reacting 300 parts of solid copolymer with 61 parts of aqueous 85.4% $H_3PO_4$ in 555 parts of acetone at 60–70° C. for 1 hour with moderate agitation. The proportions of copolymer and phosphoric acid were equivalent to 1 mol of $H_3PO_4$ for each mol of oxirane oxygen. A clear solution resulted, in which the polymeric phosphate contained approximately 15.2% of —$H_2PO_4$.

A portion of the polymeric phosphate solution was evaporated to dryness at room temperature. One part of the dry material was stirred into 100 parts of 5% sodium hydroxide, but it did not dissolve. The solid material was similarly insoluble in 5% ammonium hydroxide even at 60–70° C. Furthermore, when a portion of the acetone solution of the polymeric phosphate was added to a mixture of equal parts of acetone and 5% sodium hydroxide, the solid material precipitated and was insoluble in the medium.

Examples XIII–XVI inclusive illustrate the preparation of alkali-soluble polyphosphates from epoxy copolymers in which the polymerized epoxy-free monomer contains acyloxy groups. It will be seen that alkali-soluble polyphosphates are obtained even when the oxirane oxygen content of the copolymer is very low.

Example XIII

A copolymer of allyl glycidyl ether and vinyl acetate was prepared by warming to reflux temperature a solution of 18 parts of benzoyl peroxide in a mixture of 114 parts of allyl glycidyl ether and 430 parts of vinyl acetate. When refluxing had started, heating was discontinued and the solution was kept refluxing by the heat of the exothermic polymerization. Cooling was applied as required to control the reflux. When refluxing finally subsided, after about one-half hour, heating was again applied gradually to maintain a solution temperature of 80–85° C. for one hour. The unchanged monomers were removed by distillation under pressure of 0.1–1 mm. of mercury while warming the polymer to 80–100° C. There was obtained 437 parts of a polymeric epoxide having an oxirane oxygen content of 2.77%, corresponding to an oxirane equivalent weight of about 577 and to 20% of polymerized allyl glycidyl ether.

A solution of 10.4 parts of this polymeric epoxide in 30 parts of dioxane was treated with 3 parts of 85% phosphoric acid (1.45 moles of phosphoric acid per oxirane oxygen) and the mixture was heated at 80–85° C. for 20 minutes. The polymeric phosphate so obtained precipitated by the addition of water but dissolved readily in dilute ammonium hydroxide. Such a solution had a viscosity of about 0.5 poises at 25% solids content. Evaporation of thin layers of this solution produced smooth, colorless, glossy, transparent, hard films which had exceptionally good strength, adhesion and toughness. Curing by heating at 110–150° C. caused insolubilization.

The polymeric phosphate of this example was tested for textile size as follows: A 10% aqueous solution of the ammonium salt of the polymeric phosphate prepared as described above was obtained by adding portion-wise, with stirring, about 5 parts of concentrated ammonium hydroxide to 1000 parts of an aqueous slurry containing 9.8% of polyphosphate solids. The polyphosphate dissolved yielding a clear colorless solution of pH 2.9 containing 10% of polymeric phosphate ammonium salt. This solution was applied to a 70 denier, 34 filament yarn of polyethylene terephthalate, this yarn having a twist of 72 turns/in., and the yarn so treated was dried on a steam-heated cylinder. The treated yarn was then used in a standard loom to weave a taffeta fabric of 135 ends of yarn per inch and about 85 filling picks per inch. When the loom was operated continuously for a period of 2 hours, no breaks or irregularities appeared in the warp. In larger scale tests, this and other polymeric phosphates prepared according to this invention showed excellent yarn protection and adhesion in fabric weaving, being clearly superior to conventional sizing materials such as gelatin, starch, and various commercial synthetic sizes.

*Example XIV*

A solution of 6.8 parts of benzoyl peroxide in a mixture of 205 parts of vinyl acetate, 22.8 parts of allyl glycidyl ether and 11.3 parts of isopropanol was heated at 75° C. At this point heating was discontinued, allowing the solution to reflux gently from the heat of the exothermic polymerization. The solution temperature at reflux slowly increased over a period of about one hour to 87–89° C., while cooling was applied at intervals to avoid an excessive rate of refluxing and too rapid an increase in the solution temperature. After about one and one-half hours, moderate heating was applied to maintain a solution temperature of 85–87° C. At this stage, 11.3 parts of isopropanol was added and heating was continued for one hour at a solution temperature of 85–87° C. An addition portion of 22.6 parts of isopropanol was added and the heating was increased, allowing the low boiling fractions to distill off through a distillation column. Distillation was continued for about 2 hours, collecting 48.1 parts of distillate. At this point the viscous residue contained 86.4% of nonvolatile solids. Analysis of an isolated sample of this copolymer showed that it had an oxirane oxygen content of 1.31%, corresponding to 9.3% polymerized allyl glycidyl ether and a molecular weight of 3800.

To 260 parts of the 86.4% solution of polymeric epoxide described above was added at 40° C. a solution of 200 parts of 85% phosphoric acid in 200 parts of isopropanol (9.3 moles of phosphoric acid per oxirane oxygen). The reaction mixture was well mixed while cooling to reduce the heat of reaction. After allowing the mixture to stand for about 15 hours at 35–40° C., it was poured into six times its volume of water. The polymeric phosphate which precipitated was separated from the water by decantation and washed twice with water. A sample, purified by dissolving in acetone and again precipitating in water was dried with warming at 40° C. under reduced pressure of .1 mm. mercury. A potentiometric titration showed fairly sharp inflection points, at pH 4.4 and 10.2, on a graph plotting alkali consumed versus pH of solution. The precipitated acid polyphosphate was dissolved by adding about 560 parts of water containing about 10 parts of added concentrated ammonium hydroxide. There was thus obtained a solution of the ammonium salt of this polymeric phosphate containing 19% solids and having a pH of 5.85. Upon evaporation this solution formed clear, colorless, hard, moderately tough films. These films had excellent adhesive properties to wood, paper, metals and plastic substrates.

The usefulness of polymeric phosphates in the treatment of leather was shown by the following experiments: Chromium tanned kidskin, washed free of chromium salts with water, was drummed with about 3% by weight of Neatsfoot oil emulsion at 50–55° C. for one-half hour. To the drum was then added enough of the above described 19% solution of ammonium polyphosphate to give 45% by weight of the polymer phosphate salt based on the dry weight of the kidskin, and the drumming continued for 1 hour at 52–55° C. The treated skins were drained at 100% relative humidity for 20 hours, passed through rubber squeeze rolls to remove excess moisture and dried at 55° C. for about 2 hours. The treated leather had a phosphorus content (calculated as $P_2O_5$) of 1.2% compared to 0.5% for a control leather treated identically except that the polymeric phosphate treatment was omitted. The polymeric phosphate-treated leather had excellent body and hand and could readily be buffed to an excellent suede finish. Lower concentrations of polyphosphates, e. g., 5% and 10% based on the dry weight of kidskin, likewise produced good plumping and bodying effects.

In another experiment, tanned cowhide was swelled in dilute borax solution and treated with alum, followed by rinsing in water and by a treatment as above with the same 19% solution of ammonium polyphosphate, used in such an amount as to apply about 15% of polymer solids based on the dry weight of the leather. After drying, the treated leather had greatly improved body and hand as compared to a control sample not treated with the polyphosphate solution.

*Example XV*

A solution comprising 950 parts of vinyl acetate, 50 parts of allyl glycidyl ether, 150 parts of dioxane and 10 parts of benzoyl peroxide was heated with agitation to 73° C., at which temperature it refluxed rapidly. The heating was discontinued and the solution allowed to reflux slowly under the heat of the exothermic polymerization reaction. After about 20 minutes, the solution temperature reached 87° C. At this point, 150 parts of dioxane was added over a period of about 2 minutes, lowering the solution temperature to 84° C. After about 10 minutes the solution temperature reached 89° C. and foaming of the viscous solution was noted. Upon addition of 79 parts of isopropanol, the foaming subsided and the solution temperature was lowered to about 80° C. The temperature then began to decrease and slight heating was applied over a period of one and one-half hours to maintain a solution temperature of 80–95° C. At this point the solution contained 68% polymer solids, indicating about 94% conversion of monomers to copolymer. To this viscous mass was added 211 parts of dioxane. Upon heating with stirring 100 parts of liquid containing 29.3% vinyl acetate was distilled from the polymerization solution. The final solution of the copolymer contained 64% solids and had a viscosity of about 200 poises. The polymeric epoxide contained 0.62% of oxirane oxygen, corresponding to 4.4% polymerized allyl glycidyl ether, and it had a molecular weight of 7000.

To 781 parts of the above described polymeric epoxide solution containing 64% solids was added a solution of 220 parts of 85% phosphoric acid in 220 parts of isopropanol (9.8 moles of phosphoric acid per oxirane oxygen). The solution, which warmed spontaneously to 30–40° C., was heated to 85° C. and then allowed to stand for several hours. The polymeric phosphate was precipitated by pouring into water and it was washed thoroughly with water to remove excess phosphoric acid and solvents. This polymer was completely soluble in water upon the addition of basic reagents such as ammonia, amines, such as diethylamine, triethylamine, trimethylamine, isopropylamine and ethanolamine, and alkali metal hydroxides, such as sodium and potassium hydroxide, and it was reprecipitated from such solutions by addition of acid. The polyepoxidephosphoric acid reaction product had a neutralization equivalent to about 870 and contained 1.76% phosphorus. A solution of the ammonium salts of this polymer had a viscosity of 0.03 poise at 13% solids and a pH of 9.1. Films evaporated from this solution and air dried were colorless, clear, hard and had excellent toughness.

*Example XVI*

A mixture of 90 parts of vinyl acetate, 10 parts of 4-vinyl cyclohexene oxide (B. P. 50–52° C./8–9 mm.) and 4 parts of benzoyl peroxide was heated at refluxing temperature (73–78° C.) for about 3 hours. The highly viscous polymerization mixture was dissolved in 200 parts acetone and the polymer was precipitated by addition of cyclohexane. It was again dissolved in acetone and reprecipitated by adding petroleum ether. The viscous resin was dissolved in a little benzene and the solvents then evaporated at reduced pressure of 1 to 0.1 mm. mercury with warming at 50° C. The colorless, brittle solid polymer contained 0.74% oxirane oxygen, corresponding to 5.7% 4-vinyl cyclohexene oxide content.

To a 15% solution of the above copolymer in dioxane was added an equal weight of a 15% solution of orthophosphoric acid in dioxane (about 18 moles of phosphoric acid per oxirane oxygen). The homogeneous clear composition was heated at 75–80° C. for one hour. Upon adding this solution to water, the insoluble polymeric phosphate was precipitated. It was readily washed with water to remove excess phosphoric acid. The purified product was highly soluble in dilute sodium hydroxide and ammonium hydroxide. Films obtained from such solutions by evaporation were clear, colorless, smooth, glossy and hard.

As starting material in the preparation of the polymeric phosphates of this invention there can be used any polymeric epoxide which is a copolymer of a polymerizable, ethylenically unsaturated epoxy compound with a polymerizable, ethylenically unsaturated acyclic compound free from epoxy groups and in which the weight ratio of polymerized epoxy compound to polymerized oxirane-free unsaturate is within the range of 3:97 to 60:40. Such copolymers offer a number of important technical advantages in the preparation of polymeric phosphates. In the first place, it is possible with their use to obtain polymeric phosphates of high molecular weight, and moreover, the molecular weight is controllable to a large extent since the starting copolymers are made by free-radical initiated addition polymerization according to methods well understood in the art. In the second place, copolymers of the type defined above can be obtained which combine high molecular weight with a wide range of oxirane oxygen content, a combination which is not obtained with epoxy polymers prepared by condensation reactions, such as epoxy containing polymeric ethers. By properly selecting the weight ratios of the comonomers and the polymerization conditions, it is possible to prepare copolymers containing various amounts of the epoxy content, up to the limit (60% by weight) which has been found desirable for reasons discussed below. In the third place, the starting copolymers are in general easy to prepare by well known methods and, in many cases, they offer substantial economic advantages since the bulk of the weight can be derived from a cheap, readily available polymerizable monomer.

The stated limits for the weight ratio of polymerized components in the starting copolymers are critical. If there is appreciably less than 3% of polymerized epoxy compound based on the weight of total polymerized materials, there will not be enough epoxy groups present to react effectively with the phosphoric acid. On the other hand, if the polymerizable epoxy compound is present in the polymerization mixture in proportions such that the resulting copolymer has appreciably more than 60% of polymerized epoxy compound based on the total weight of polymerizable materials, then the polymerization becomes difficult to carry out and control since unsaturated epoxy monomers do not polymerize well per se. Furthermore, the above-mentioned economic advantages are substantially lessened.

Another way of expressing the chemical composition of the suitable copolymers from which the polymeric phosphates are prepared is in terms of oxirane oxygen content. To obtain polyphosphates having a phosphate content sufficient to impart appreciably different properties, the polymeric epoxide should contain at least 0.3% by weight of oxirane oxygen. Preferably, the polymeric epoxide contains at least 0.6% by weight of oxirane oxygen. The upper limit of oxirane oxygen content suitable to give useful, economical polymeric phosphates has been found to be about 8% by weight, and preferably 7%.

Another way of expressing these figures is in terms of oxirane equivalent weight, that is, the molecular weight corresponding to one atom of oxirane oxygen. It will be seen that 0.3% by weight of oxirane oxygen corresponds to an oxirane equivalent weight of about 5300, which is the upper limit for the suitable polymeric epoxides. Preferably, the oxirane equivalent weight is less than 2500 for polyepoxides having molecular weights of about 5000 to 7500. The properties of the polyphosphates, however, also depend upon the composition of the epoxide polymer as well as upon its molecular weight. The molecular weight of the starting polymeric epoxide preferably ranges between about 1500 and about 10,000 but it can be as high as 50,000 or even higher. In general, if the molecular weight is high, it is preferred that the oxirane equivalent weight be low, e. g., 300 to 500. If the molecular weight is low, for example, 1500–7000, the oxirane equivalent weight may be somewhat higher, for example, between 1000 and 2500, depending upon the composition of the copolymer. In general, the copolymer contains at least 1.5 epoxy groups per molecule.

The epoxide copolymers are prepared by free radical-initiated polymerization according to known methods and with known free radical-producing initiators. It is of course important to avoid conditions which would tend to open or otherwise destroy the epoxy groups, such as the presence of strong acids. In order to produce copolymers of the desired composition, the monomers are in general used in relative amounts within the range of 5 to 75 parts oxirane-containing unsaturate for 95 to 25 parts oxirane-free unsaturate. Two or more comonomers of each type may be used provided the above ratios are observed.

A number of epoxide copolymers have been shown in the examples. Other suitable starting materials include the copolymers of other ethylenically unsaturated epoxy compounds such as butadiene monoepoxide, glycidyl acrylate, vinyl glycidyl phthalate, allyl glycidyl maleate, allyl glycidyl phthalate, and the like with various acyclic vinylidene monomers such as vinyl acetate, methyl acrylate, ethyl acrylate, methyl methacrylate, acrylamide, methacrylamide, acrylonitrile, methacrylonitrile, 1,3-butadiene, isoprene, 2-chloro-1,3-butadiene, vinyl chloride, vinyl fluoride, isopropenyl acetate, vinylidene chloride, methyl vinyl ether, acrolein, methyl vinyl ketone, and the like.

The preferred copolymers are made from monomers having only one ethylenic, carbon to carbon double bond, to minimize the danger of cross-linking to insoluble materials. For best results and maximum freedom from side reaction during the subsequent esterification, the copolymers should be free from groups, other than epoxy groups, which are readily reactive with phosphoric acid, such as amino, hydroxyl, mercapto groups and the like.

The preferred starting materials, because they give the most generally useful polymeric phosphates, are the copolymers of unsaturated epoxy compounds with polymerizable acyclic vinylidene compounds, i. e., acyclic compound having a terminal methylene group attached through a double bond to the adjacent carbon atom. These preferred materials include the copolymers of unsaturated epoxy compounds with the vinyl halides, e. g., vinyl chloride, vinyl fluoride; the vinyl esters of monocarboxylic acids, e. g., vinyl acetate, vinyl propionate; the acrylic and methacrylic acids, their esters, nitriles, and amides, e. g., acrylic acid, methyl methacrylate, ethyl acrylate, acrylonitrile, methacrylonitrile, methacrylamide; the monounsaturated hydrocarbons having a terminal ethylenic double bond, e. g., isobutylene, and the like. The preferred epoxy monomers are glycidyl methacrylate and allyl glycidyl ether.

The most useful starting materials, because they lead to alkali-insoluble polymeric phosphates possessing the best combination of properties, particularly with respect to use in coating compositions, are the copolymers of glycidyl methacrylate with methacrylates of alkanols of one to four carbon atoms, e. g., methyl, ethyl, n-propyl and n-butyl methacrylates, such copolymers containing from 5 to 35% by weight of polymerized glycidyl methacrylate. Outstanding results are obtained with the alkali-insoluble polymeric phosphates derived from copolymers containing from 15 to 25% by weight of polymerized glycidyl methacrylate and from 85 to 75% by weight of polymerized methacrylate of an alkanol of one to four carbon atoms, and more particularly methyl methacrylate. Thus, the preferred compounds of this invention are the alkali-insoluble polymeric phosphates obtained by action of phosphoric acid on copolymers containing from 15-25% by weight of polymerized glycidyl methacrylate and 85-75% of polymerized methyl methacrylate. When these copolymers are substantially completely phosphated by reacting them with one mole or more of phosphoric acid per oxirane oxygen the calculated phosphate content, as $-H_2PO_4$, of the resulting phosphates is between 9.3 and 14.6%. Products which are even more satisfactory from the standpoint of use in coating compositions are obtained by partial phosphation of these copolymers, e. g., by reacting them with 0.6–0.9 mole of phosphoric acid per oxirane oxygen. The polyphosphates so obtained produce coating compositions which may be cured at lower baking temperatures than the substantially completely phosphated products.

When alkali-soluble polymeric phosphates are desired, preferred starting materials are the copolymers of allyl glycidyl ether and vinyl acetate, especially those containing between 3% and 50% by weight of polymerized allyl glycidyl ether. Another class of polymers leading to useful alkali-soluble polymeric phosphates are the copolymers of glycidyl methacrylate and methyl methacrylate containing from 35% to 50% by weight of polymerized glycidyl methacrylate.

As already stated, it is important to use at least about one-half mole of phosphoric acid per oxirane oxygen in the preparation of the polymeric phosphates of this invention, since the use of smaller amounts tends to cause crosslinking and gelation of the polymeric epoxide. The upper limit is not critical since the unreacted acid can readily be removed by washing with water, and there may be used as much as 25 moles, or even more, of phosphoric acid per oxirane oxygen. However, when alkali-insoluble polyphosphates are to be prepared from copolymers containing more than about 3.9% oxirane oxygen, it is desirable to use less than one mole of phosphoric acid per oxirane oxygen. For the preparation of alkali-soluble polyphosphate, a satisfactory range of proportions is between 1 and 10 moles of phosphoric acid per oxirane oxygen. The optimum amount will vary to some extent in relation to the concentration of the epoxide polymer in the reaction medium. With dilute solutions of epoxide polymers, e. g., solutions of about 10% concentration or lower, amounts of phosphoric acid as low as about one-half mole per oxirane oxygen may be used with little danger of gelation. With more concentrated solutions of epoxide polymers, it is desirable to use at least 1 mole of phosphoric acid per oxirane oxygen, and with concentrations in the range of 20–75% it is preferable to use from 4 to 15 moles of phosphoric acid per oxirane equivalent.

Orthophosphoric acid is the preferred phosphoric acid agent because of its availability at low cost and of its easy reaction to give uniform products, but other acids of phosphorus such as metaphosphoric and pyrophosphoric acids can be used. Likewise, partially esterified phosphorus acids such as methyl acid phosphate or butyl acid phosphate can be used.

In order to minimize the possibility of crosslinking of the polymeric epoxide, the esterification reaction should be carried out in a solution of the polymer in an organic solvent, which solvent should, of course, be substantially inert toward the epoxide linkages and the phosphoric acid. Such solvents are represented by the aromatic hydrocarbons, such as benzene, toluene or the xylenes; aliphatic or aromatic ketones such as acetone, methyl ethyl ketone, cyclobutanone, acetophenone; acyclic or cyclic ethers such as di-n-butyl ether, dioxane, tetrahydrofurane, diphenylene oxide; aliphatic alcohols such as ethanol, n-butanol, isopropanol; and the like. Preferably, the solvent is one that is miscible with water to permit the use of aqueous solutions of phosphoric acid. The polymer solutions can be as dilute as desired, e. g., down to 1% concentration by weight, but it is in general unnecessary to use a concentration below 10%. The concentration can be as high as possible, e. g., up to 75%, a preferred range being 10 to 35% by weight.

The esterification reaction can take place at a practical speed at any temperature above 0° C. and below 100° C. It proceeds rather slowly at temperatures up to 30° C., and more rapidly at elevated temperatures up to 100° C. A particularly useful range of temperatures is 50° to 85° C. Within this range the reaction is, in general, substantially complete within a period of one-half to three hours. It is desirable to avoid long reaction periods and high temperatures. In other words, conditions as mild as possible are desirable.

The reaction product, i. e., the polymeric phosphate, is preferably isolated by adding sufficient water to the reaction mixture to precipitate the polymer or, if the latter is water-soluble, an aqueous solution of a salt such as sodium chloride, potassium sulfate, sodium phosphate, etc., can be used. The polymer is then washed with water or a salt solution to remove the excess phosphoric acid. With the partially phosphated materials, such a separation is not necessary. A coating composition may be prepared directly from the resulting solution.

The polymeric esters of phosphoric acid so obtained are resinous materials varying in consistency from viscous semi-solids to tough, moderately brittle, hard solids. Their molecular weights vary from about 1500 to about 50,000 or higher, but are generally in the range of about 2000 to about 10,000. These products are soluble in organic solvents, generally in the same solvents in which the polymeric epoxides are soluble.

As already discussed, some of the polymeric phosphates of this invention are soluble in dilute aqueous alkali, or even in water. Alkali-solubility appears when the calculated phosphate content is above about 19% by weight as $-H_2PO_4$, with the exception of the polyphosphates derived from vinyl carboxylate/epoxy copolymers, which are alkali-soluble even at much lower phosphate contents. These highly phosphated products are soluble in water containing sufficient alkali for partial or complete neutralization of the phosphoric acid groups. Such alkali may be an alkali metal hydroxide, e. g., sodium or potassium hydroxide, ammonia, or an alkylamine, preferably one containing 1 to 6 carbon atoms, such as methylamine, n-butylamine, diethylamine, triethylamine, ethanolamine, diethanolamine, cyclohexylamine, and the like. These polymeric phosphates also form salts with other metals such as copper, silver, zinc, aluminum, iron, nickel, cobalt, chromium or manganese. Some of these salts such as the zinc polyphosphates are insoluble in water as neutral salts but are water-soluble as partially neutralized acid salts, and are also soluble in certain organic solvents. Other salts such as the nickel and copper salts are soluble in water when combined with excess ammonia. This is presumably due to the formation of a metal-ammonia complex. The most useful of the salts are the water-soluble alkali metal, ammonium or substituted ammonium salts, i. e., the amine salts and particularly the ammonium salts.

The most important products of this invention, however, are those polymeric phosphates which are insoluble in dilute aqueous alkali. These products in general have a calculated phosphate content of less than about 19% as $-H_2PO_4$. A phosphate content of at least 1.75%, and preferably at least 3%, is desirable to impart useful improvements and substantially different properties to the polymeric phosphates in comparison with the copolymers from which they are derived, and the best properties are obtained when the $-H_2PO_4$ content is in the range of from 7% to 15%. These alkali-insoluble polyphosphates give coatings which are harder, glossier, less sensitive to water and chemicals and more resistant to discoloration than the alkali-soluble polyphosphates.

The polymeric phosphates of this invention, and particularly the alkali-insoluble ones, are outstandingly useful as ingredients of coating compositions, which can be clear or pigmented. Clear compositions can be prepared with any suitable organic solvent, such as acetone, methyl isobutyl ketone, n-butyl alcohol and the like. A wide variety of pigments commonly used in organic coating compositions can be incorporated, including titanium dioxide, carbon black, iron blues, phthalocyanine blues and greens, metal oxides and chromates, organic maroons, and various inert extenders such as talc, barytes and china clay. Other film-forming materials, which are compatible with the polyphosphates of this invention and which are soluble in the same solvents, may be blended with polyphosphate solutions to produce clear or pigmented coating compositions. Examples of such film-forming materials are urea-formaldehyde resins, melamine-formaldehyde resins, alkyd resins and other natural and synthetic polymers.

Two other important uses of the products of this invention have also been described, these being the sizing of fibers of the polyester type, e. g., polyethylene terephthalate, and the treatment of leather. They have many other applications. For example, the already mentioned metal salts (e. g., copper or nickel) which can be water-solubilized by means of ammonia, may be applied to substrates from aqueous solutions. On air-drying, the residual films evolve ammonia and gradually become insoluble in and insensitive to water. Curing at elevated temperatures, e. g., 80–150° C., increases the rate of insolubilization. Films or coatings of water-soluble polyphosphate salts such as those of aluminum or chromium may be prepared in situ by impregnating substrates such as paper, textiles, wood, leather or ceramics with a water-soluble salt of these metals and subsequently treating the impregnated substrate with a soluble ammonium or alkali metal polyphosphate. Alternatively, the substrate may be impregnated first with the soluble polyphosphate and then treated with a suitable inorganic salt. This treatment forms the insoluble metal polyphosphate within the pores or fibers of the substrate. Thus, there can be obtained coatings or films having certain special properties such as improved body or stiffness, increased stability and durability, increased flame-resistance, etc.

Polyphosphate salts of metals such as copper or mercury have bactericidal and fungicidal properties and are useful as spreader-sticker or anchoring agents for insecticides, insect-repellents, herbicidal compositions and preservatives for wood or textiles.

Some of the polymeric phosphates of this invention have excellent adhesive properties because of their good initial tackiness and the high film strength which develops on air-drying or curing at elevated temperatures. Thus, they are useful as adhesives for paper, textiles, wood, metal, plastics and other substrates of similar or different nature.

The water- or alkali-soluble polymeric phosphates of this invention are compatible to a considerable extent with colloidal silica sols and such compositions are useful in adhesives, finishes and in dispersed systems such as polymer dispersions and wax dispersions.

Aqueous solutions of ammonium, amine or alkali metal polyphosphates are useful as clear finishes for wood, glass, ceramics, textiles, paper, metals and other substrates and may be used either as primer-sealer coats for subsequent application of other finishes or as the total protective or decorative finish for these substrates. Salts such as cupric ammonium polyphosphates are especially useful for sealing wood, textile and paper surfaces since the salt becomes insensitive to water on drying and also imparts a preservative action to such cellulosic substrate surfaces.

Aqueous solutions of low molecular weight, soluble polyphosphates show surface active properties and can be used as dispersing agents in preparing oil or paint emulsions and in polymerizing ethylenically unsaturated compounds in aqueous systems. They are especially useful as pigment dispersing agents and pigment binders in the preparation of water paints and pigment printing compositions. They are also useful as lime sequestering agents, detergents and detergent assistants.

As many apparently widely different embodiments of this invention may be made without departing from the spirit and scope thereof, it is to be understood that this invention is not limited to the specific embodiments thereof except as defined in the appended claims.

I claim:

1. A polymeric material selected from the class consisting of polymeric phosphates and their water-soluble salts, said polymeric phosphates having a calculated phosphate content of at least 1.75% by weight as $-H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of a polymerized, ethylenically unsaturated epoxy monomer and within the range of 97 to 40% by weight of a polymerized, acylclic ethylenically unsaturated epoxy-free monomer.

2. A polymeric material as set forth in claim 8 wherein said acyclic ethylenically unsaturated epoxy-free monomer contains a single ethylenic double bond as the sole carbon-to-carbon unsaturation.

3. A polymeric material as set forth in claim 8 wherein said acyclic ethylenically unsaturated epoxy-free monomer is a methacrylate of an alkanol of 1 to 4 carbon atoms.

4. A polymeric material as set forth in claim 8 wherein said acyclic ethylenically unsaturated epoxy-free monomer is methyl methacrylate.

5. A polymeric material as set forth in claim 8 wherein said acyclic ethylenically unsaturated epoxy-free monomer is vinyl acetate.

6. A polymeric material as set forth in claim 8 wherein said polymeric phosphates are the reaction product of said polymeric epoxide copolymer with phosphoric acid in amount of at least one mole per oxirane oxygen atom in said copolymer.

7. A polymeric material as set forth in claim 8 wherein said polymeric phosphates have a calculated phosphate content within the range of 3 to 19% by weight as the —$H_2PO_4$ and said polymeric epoxide copolymer has an epoxide oxygen content within the range of 0.6 to 7% by weight.

8. A polymeric phosphate having a calculated phosphate content of at least 1.75% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of a polymerized, ethylenically unsaturated epoxy monomer and within the range of 97 to 40% by weight of a polymerized, acyclic ethylenically unsaturated epoxy-free monomer.

9. A clear coating composition comprising a solvent and as a film-forming material in solution therein a polymeric phosphate as set forth in claim 8.

10. A pigmented coating composition comprising a pigment, a solvent and as a film-forming material in solution therein a polymeric phosphate as set forth in claim 8.

11. A polymeric phosphate having a calculated phosphate content of at least 1.75% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of polymerized glycidyl methacrylate and within the range of 97 to 40% by weight of a polymerized, acyclic vinylidene epoxy-free monomer containing a single ethylenic double bond as the sole carbon-to-carbon unsaturation.

12. A polymeric phosphate having a calculated phosphate content of at least 1.75% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of polymerized allyl glycidyl ether and within the range of 97 to 40% by weight of a polymerized, acyclic vinylidene epoxy-free monomer containing a single ethylenic double bond as the sole carbon-to-carbon unsaturation.

13. A polymeric phosphate having a calculated phosphate content of at least 3% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of allyl glycidyl ether and within the range of 97 to 40% by weight of vinyl acetate.

14. A polymeric phosphate having a calculated phosphate content within the range of 3 to 19% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.6 to 3.9% by weight and containing within the range of 5 to 35% by weight of polymerized glycidyl methacrylate and within the range of 95 to 65% by weight of a polymerized methacrylate of an alkanol of 1 to 4 carbon atoms.

15. A polymeric phosphate as set forth in claim 14 wherein said polymerized methacrylate of an alkanol of 1 to 4 carbon atoms is polymerized methyl methacrylate.

16. A polymeric phosphate having a calculated phosphate content of at least 1.75% by weight as —$H_2PO_4$, and containing epoxy groups unreacted with phosphoric acid, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 0.3 to 8% by weight and containing within the range of 3 to 60% by weight of a polymerized, ethylenically unsaturated epoxy monomer and within the range of 97 to 40% by weight of a polymerized, acyclic ethylenically unsaturated epoxy-free monomer.

17. A polymeric phosphate having a calculated phosphate content of above 19% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 3.9 to 7% by weight and containing within the range of 3 to 60% by weight of a polymerized, ethylenically unsaturated epoxy monomer and within the range of 97 to 40% by weight of a polymerized, acyclic ethylenically unsaturated epoxy-free monomer.

18. A polymeric phosphate having a calculated phosphate content of above 19% by weight as —$H_2PO_4$, and being the reaction product of a polymeric epoxide copolymer having a molecular weight of at least 1500 with phosphoric acid in amount of at least one-half mole per oxirane oxygen atom in said copolymer, said polymeric epoxide copolymer having an epoxide oxygen content within the range of 3.9 to 8% by weight and containing within the range of 3 to 60% by weight of allyl glycidyl ether and within the range of 97 to 40% by weight of vinyl acetate.

19. A polymeric phosphate as set forth in claim 11 wherein said acyclic vinylidene epoxy-free monomer is methyl methacrylate.

20. A polymeric phosphate as set forth in claim 11 wherein said polymeric phosphate is the reaction product of said polymeric epoxide copolymer with phosphoric acid in amount of at least one mole per oxirane oxygen atom in said copolymer and said acrylic vinylidene epoxy-free monomer is methyl methacrylate.

References Cited in the file of this patent

UNITED STATES PATENTS

| 2,160,943 | Britton et al. | June 6, 1939 |
| 2,470,324 | Staudinger et al. | May 17, 1949 |
| 2,524,432 | Dorough | Oct. 3, 1950 |
| 2,541,027 | Bradley | Feb. 13, 1951 |
| 2,606,810 | Erickson et al. | Aug. 12, 1952 |